US012388824B2

(12) United States Patent
Rothschild et al.

(10) Patent No.: US 12,388,824 B2
(45) Date of Patent: Aug. 12, 2025

(54) SYSTEM AND METHOD TO DISTRIBUTE ACCESS TO SHARED ACCOUNTS WITH A TRUSTED INTERMEDIATE SERVICE MANAGER

(71) Applicant: Dell Products L.P., Round Rock, TX (US)

(72) Inventors: Seth Jacob Rothschild, Littleton, MA (US); Radia Joy Perlman, Redmond, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 227 days.

(21) Appl. No.: 18/179,962

(22) Filed: Mar. 7, 2023

(65) Prior Publication Data

US 2024/0305638 A1   Sep. 12, 2024

(51) Int. Cl.
*H04L 9/40* (2022.01)
*H04L 67/02* (2022.01)

(52) U.S. Cl.
CPC .............. *H04L 63/10* (2013.01); *H04L 67/02* (2013.01)

(58) Field of Classification Search
CPC ................................ H04L 63/10; H04L 67/02
USPC .............................. 726/3; 709/217, 223, 225
See application file for complete search history.

(56) References Cited

U.S. PATENT DOCUMENTS

| 2010/0285871 | A1* | 11/2010 | Shah | H04L 63/104 |
| | | | | 463/29 |
| 2011/0237222 | A1* | 9/2011 | Niejadlik | H04L 63/10 |
| | | | | 455/411 |
| 2013/0174223 | A1* | 7/2013 | Dykeman | G06F 21/10 |
| | | | | 726/4 |
| 2014/0248852 | A1* | 9/2014 | Raleigh | H04W 12/068 |
| | | | | 455/566 |
| 2017/0064401 | A1* | 3/2017 | Kim | H04N 21/4147 |

FOREIGN PATENT DOCUMENTS

CN              104012150 B   *  5/2018   ............. G06F 21/31

* cited by examiner

*Primary Examiner* — Liang Che A Wang
(74) *Attorney, Agent, or Firm* — Chamberlain, Hrdlicka, White, Williams & Aughtry; Aly Z. Dossa (57) ABSTRACT

A method for managing access to a web-based service includes obtaining, by an intermediate service manager and from a managing client, credentials for a managing account associated with the web-based service and an access condition of accessing the web-based service by a second account to the intermediate service manager, obtaining a request, by an accessing client associated with the second account, for accessing the web-based service using the managing account, and based on the request and the access condition, communicating with the web-based service to create a session with the web-based service, and providing access to site data of the session via a user interface and based on the access condition.

16 Claims, 7 Drawing Sheets

SYSTEM AND METHOD TO DISTRIBUTE ACCESS TO SHARED ACCOUNTS WITH A TRUSTED INTERMEDIATE SERVICE MANAGER

BACKGROUND

In a system that includes clients accessing a web-based service, access to an account to the web-based service may be shared between one or more clients. It may be difficult for one client to limit the type of access to the account by a second client if the credentials to the account are provided to the second client. For example, the second client, against the desires of the first client, may have the ability to alter the credential information to the account or perform other actions not desired by the first client.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a method for setting up access conditions for accessing clients in accordance with one or more embodiments of the invention.

FIG. 2.2 shows a method for accessing a managing account using a trusted intermediate service manager in accordance with one or more embodiments of the invention.

FIGS. 3.1-3.3 show example use cases in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing accounts to web-based services. Specifically, embodiments relate to methods and systems for using a trusted intermediate service manager that stores credential information for an account to a web-based service and manages the access to the account by one or more users. For example, a first user may be a managing user that has all access to the account (including knowledge of the credential information such as the username and password associated with the account). The first user may wish other users to have limited access to the account without providing said credential information. The first user may utilize the services of the trusted intermediate service manager to specify the limited access to be provided to the other users. The trusted intermediate service manager may offer a user interface that offers access to the web-based service to the specified other users and limits the access to the account via the user interface and in accordance with the specified limited access.

The following describes various embodiments of the invention.

Figure 1:
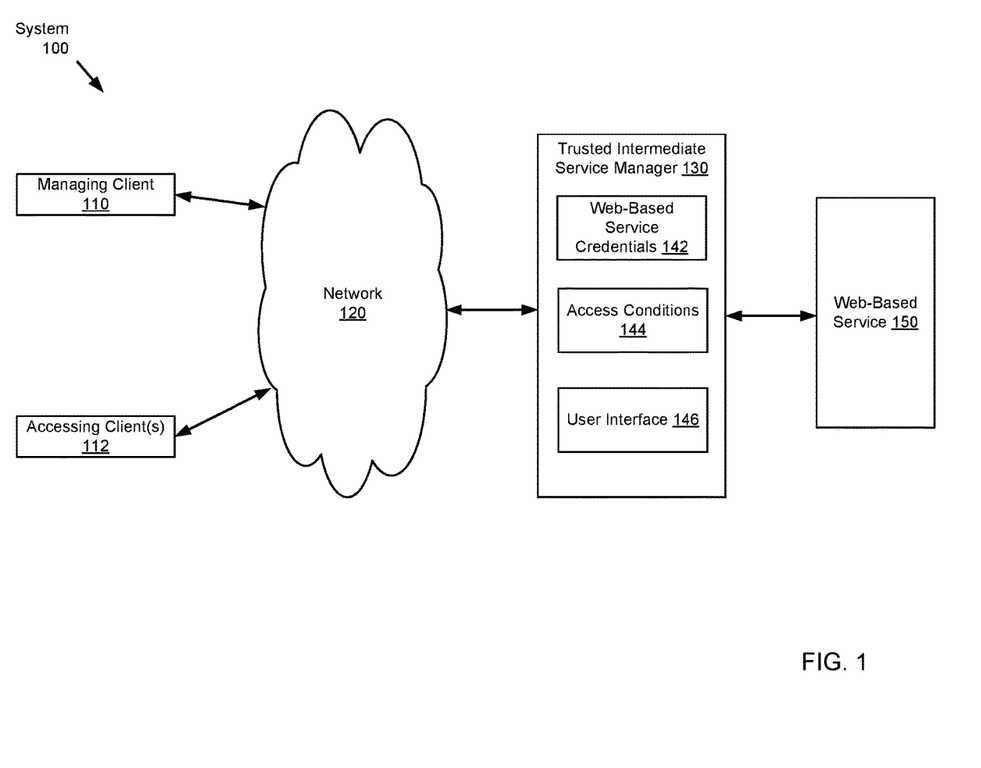
FIG. 1 shows a diagram of a system in accordance with one or more embodiments of the invention.

FIG. 1 shows a diagram of a system (100) in accordance with one or more embodiments of the invention. The system (100) includes any number of clients (110, 112), a network (120), a trusted intermediate service manager (130), and a web-based service (150). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the web-based service (150), the clients (110), and the trusted intermediate service manager (130) may be physical or logical devices, as discussed below. In one or more embodiments, the system (100) may include any number of storage devices without departing from the scope of the invention.

While FIG. 1 shows a specific configuration of the system (100), other configurations may be used without departing from the scope of the invention. For example, although the clients (110) and the trusted intermediate service manager (130) are shown to be operatively connected through the network (120), the clients (110) and the trusted intermediate service manager (130) may be directly connected, without an intervening network (e.g., 120). As yet another example, although the trusted intermediate service manager (130) and the web-based service (150) are shown to be directly connected, the trusted intermediate service manager (130) and the web-based service (150) may be directly connected or otherwise operatively connected without departing from the invention.

Further, the functioning of the clients (110, 112) and the trusted intermediate service manager (130) is not dependent upon the functioning and/or existence of the other device(s) in the system (100). Rather, the clients (110, 112) and the trusted intermediate service manager (130) may function independently, and perform operations locally that do not require communication with other devices. Accordingly, embodiments disclosed herein should not be limited to the configuration of devices and/or components shown in FIG. 1.

In one or more embodiments, the web-based service (150) is a service that may utilize web-based protocols (e.g., hypertext transfer protocol (HTTP)) to provide services to clients such as, for example, the managing client (110) and the accessing clients (112). The services offered by the web-based service may include, for example, transactional services, social media platforms, banking services, database services, video streaming services, media storage services, and messaging services. Other services may be provided by the web-based service (150) without departing from the invention.

As used herein, "computing" refers to any operations that may be performed by a computer, including (but not limited to): computation, data storage, data retrieval, communications, etc.

In one or more embodiments, as being a physical computing device or a logical computing device (e.g., a VM), the web-based service (150) may be configured for hosting and maintaining various workloads, or for providing a computing environment (e.g., computing power and storage) whereon workloads may be implemented. The web-based service (150) may also exchange data with other nodes (e.g., other source storage devices, target storage devices, etc.) registered in/to the network (120) in order to, for example, participate in a collaborative workload placement. For example, the web-based service (150) may split up a request (e.g., an operation, a task, an activity, etc.) with another web-based service, coordinating its efforts to complete the request (e.g., to generate a response) more efficiently than if the web-based service (150) had been responsible for completing the request.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc.

To provide the computer-implemented services to the users, the server may perform computations locally and/or remotely. By doing so, the server may utilize different computing devices (e.g., 400, FIG. 4) that have different quantities of computing resources (e.g., processing cycles, memory, storage, etc.) to provide a consistent user experience to the users.

In one or more embodiments, in order to provide computer-implemented services, the web-based service (150) may include a collection of physical components (e.g., processing resources, storage/memory resources, networking resources, etc.) configured to perform operations of the web-based service (150) and/or otherwise execute a collection of logical components (e.g., applications, virtualization resources, etc.) of the web-based service (150).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement data within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

Figure 4:
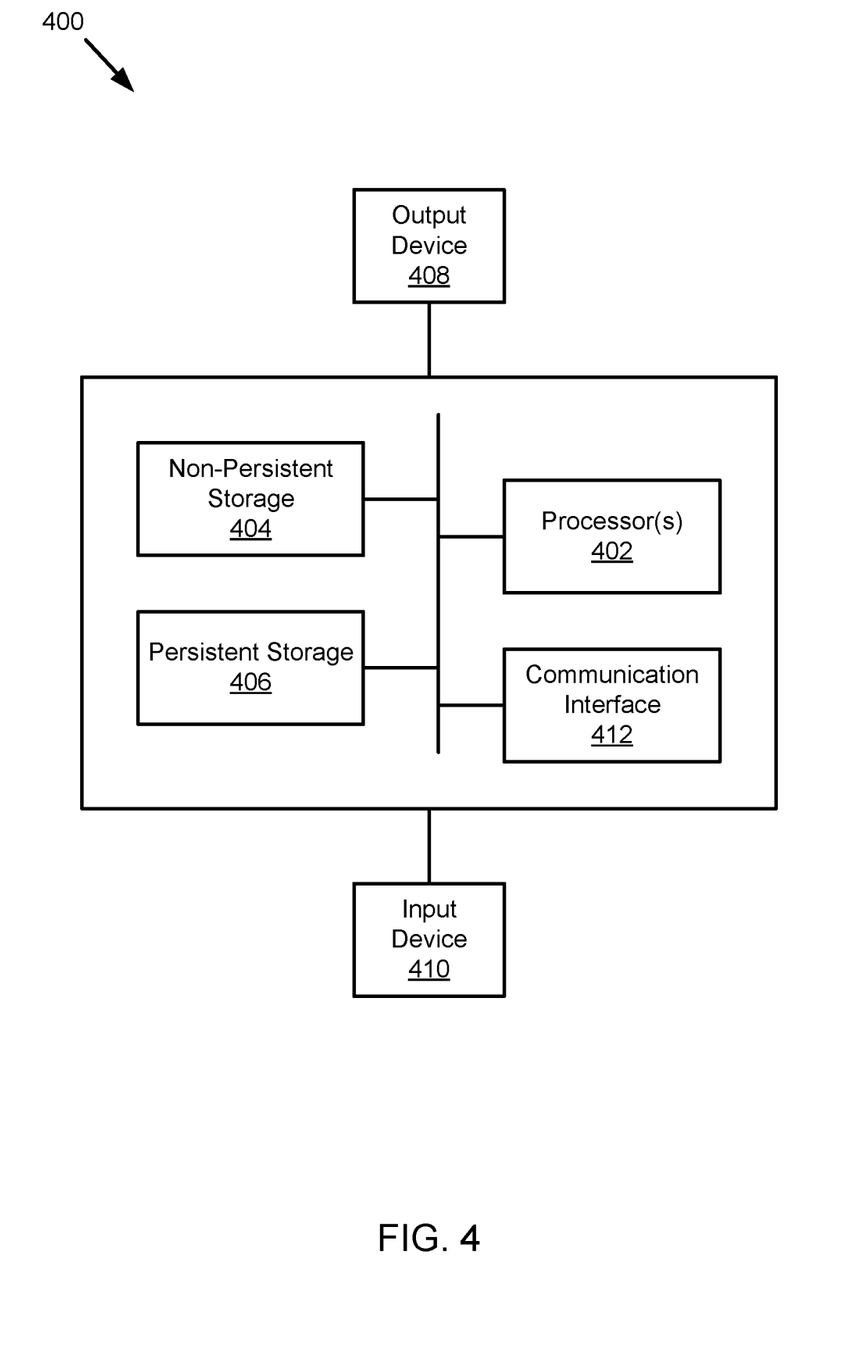
FIG. 4 shows a diagram of a computing device in accordance with one or more embodiments of the invention.

In one or more embodiments, the web-based service (150) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the web-based service (150) described throughout this application.

Alternatively, in one or more embodiments, the web-based service (150) may be implemented as a logical device. The logical device may utilize the computing resources of any number of computing devices to provide the functionality of the web-based service (150) described throughout this application.

In one or more embodiments of the invention, the managing client (110) includes functionality for communicating with the trusted intermediate service manager (130). The managing client (110) may be associated with an account associated with the web-based service (150) (also referred to as a "managing account"). The managing client (110) may desire for one or more accessing clients (112) to utilize the managing account. However, the managing client (110) may not want the accessing client(s) (112) to have full access to the managing account.

To provide limited access to the managing account, the managing client (110) may utilize the trusted intermediate service manager (130) that stores the credentials to the web-based service (142) (i.e., the credential information for the managing account) and offers a user interface (146) through which the accessing clients (112) may access the managing account.

Figure 21:
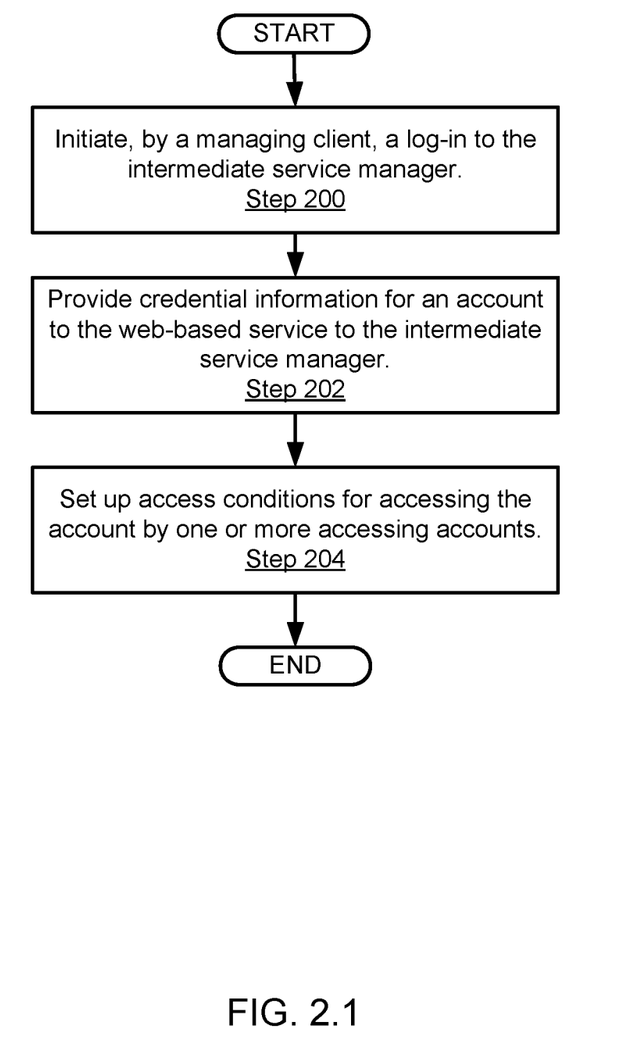

The trusted intermediate service manager (130) may limit the access using the user interface (146) in accordance with access conditions (144) specified by the managing client (144). In one or more embodiments of the invention, the access conditions (144) are data structures that specify the type of access to be offered (or limited) to the accessing clients (112). The access conditions (144) may be set up by the managing client (110) in accordance with FIG. 2.1.

In one or more embodiments, the trusted intermediate service manager (130) manages the access to the web-based service (150) by providing a user interface (146) that provides an interface for the accessing clients (112) to access the web-based service. For example, the trusted intermediate service manager (130) may log into the web-based service using the web-based service credentials (142) of the managing account to initiate a session, in response to a request by an accessing client (112). Once the session is initiated, the user interface (146) may be used to provide access to at least a portion of site data associated with the session while maintaining the access conditions (144) set up by the managing client (110). In this manner, by not providing access to the session (e.g., by not sending a session token associated with the session), the trusted intermediate service manager (130) does not inadvertently provide any information that goes against the access conditions. As such, the trusted intermediate service manager (130) determines the site data associated with the session that may be provided via the user interface.

The type of access conditions (144) set up by the managing client (110) may depend on the type of services provided by the web-based service. Examples of access conditions (144) for corresponding web-based services include, but are not limited to: preventing the ability to change the credentials (e.g., the password) of the managing account, preventing the ability to purchase a product using the managing account, accessing any specified information (e.g., bank account numbers, routing numbers, available balance), preventing the ability to transfer funds between accounts, preventing the ability to access the managing account after a pre-defined period of time (e.g., after one week), preventing the ability to post or delete messages (e.g., for a managing account associated with a social media platform), and preventing the ability to modify personal information associated with the managing account. Other types of access conditions (144) may be specified without departing from the invention.

In one or more embodiments of the invention, the trusted intermediate service manager (130) uses a white-list schematic to read the access conditions (144). Said another way, the trusted intermediate service manager (130) may specify the types of access that the accessing clients (112) is allowed to have when accessing the managing account. In other embodiments, the trusted intermediate service manager (130) uses a black-list schematic to read the access conditions (144). Said another way, the trusted intermediate service manager (130) may specify the types of access that the accessing clients (112) is prevented from when accessing the managing account. Other schematics may be used for the accessing conditions (144) without departing from the invention.

In one or more embodiments, each user may have a personalized user account that may, for example, grant access to certain data, applications, and computing resources of the clients (110). For example, a user (e.g., of the managing client (110) or of one of the accessing clients (112)) may be directed to a login screen of the trusted intermediate service manager (130) when the user connects to the trusted intermediate service manager (130). Once the login screen of the trusted intermediate service manager (130) is displayed, the user may enter credentials (e.g., username, password, etc.) of the user on the login screen. The login screen may be a graphical user interface (GUI) generated by a visualization module (not shown) of the trusted intermediate service manager (130). In one or more embodiments, the visualization module may be implemented in hardware (e.g., circuitry), software, or any combination thereof.

In one or more embodiments, the GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

Similar to the web-based service (150), as being a physical computing device or a logical computing device (e.g., a VM), the trusted intermediate service manager (130) may be configured for hosting and maintaining various workloads, or for providing a computing environment (e.g., computing power and storage) whereon workloads may be implemented. The web-based service (150) may also exchange data with other nodes (e.g., other source storage devices, target storage devices, etc.) registered in/to the network (120) in order to, for example, participate in a collaborative workload placement. For example, the trusted intermediate service manager (130) may split up a request (e.g., an operation, a task, an activity, etc.) with another web-based service, coordinating its efforts to complete the request (e.g., to generate a response) more efficiently than if the trusted intermediate service manager (130) had been responsible for completing the request.

Further similar to the web-based service (150), in order to provide computer-implemented services, the trusted intermediate service manager (130) may include a collection of physical components (e.g., processing resources, storage/memory resources, networking resources, etc.) configured to perform operations of the trusted intermediate service manager (130) and/or otherwise execute a collection of logical components (e.g., applications, virtualization resources, etc.) of the web-based service (150).

In one or more embodiments, the trusted intermediate service manager (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the trusted intermediate service manager (130) described throughout this application.

Alternatively, in one or more embodiments, similar to the web-based service (150), the trusted intermediate service manager (130) may also be implemented as a logical device.

While the system (100) illustrates only one web-based service (150), the trusted intermediate service manager (130) may further include functionality for providing services associated with two or more web-based services without departing from the invention. In such embodiments in which the trusted intermediate service manager (130) provides such services, the trusted intermediate service manager (130) may include web-based credential information, access conditions, and user interfaces each associated with the web-based services for which the trusted intermediate service manager (130) provides its services.

In one or more embodiments, the clients (110, 112) may provide computer-implemented services to users of the clients (110, 112) (and/or other computing devices such as, other clients or other types of devices). The clients (110, 112) may provide any number and any type of computer-implemented services (e.g., data storage services, electronic communication services, etc.). The clients (110, 112) may be physical or logical devices, as discussed throughout this disclosure.

In one or more embodiments, the clients (110, 112) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, similar to the web-based service (150), the clients (110, 112) may also be implemented as logical devices.

In one or more embodiments, users may interact with (or operate) the clients (110) in order to initiate work-related tasks (e.g., production workloads). In one or more embodiments, the accessibility of users to the clients (110) may depend on a regulation set by the administrators. This may be realized by implementing a "virtualization" technology. Virtualization allows for the generation of a VM that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, for example, a user may be directed to a login screen of a client when the user connects to that client. Once the login screen of the client is displayed, the user may enter credentials of the user on the login screen. The login screen may be a graphical user interface (GUI) generated by a visualization module of the client.

In one or more embodiments, the GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (120) may represent a computing network configured for computing resource and/or messages exchange among registered computing hosts (i.e., the storage devices (130, 150), the clients (110), etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the storage devices (130, 150) and the clients (110) through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more nodes (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

FIG. 2.1 shows a method for setting up access conditions for accessing clients in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.1, the method shown in FIG. 2.1 may be executed by, for example, the above-discussed managing client (e.g., 110, FIG. 1). Other components of the system (100) illustrated in FIG. 1 may also execute all or part of the method shown in FIG. 2.1 without departing from the scope of the invention.

In Step 200, a login to the trusted intermediate service manager is initiated. In one or more embodiments, the managing client logs into the trusted intermediate service manager using the login information associated with the trusted intermediate service manager for the account of the managing client. The login information may include, for example, a username and a password.

In Step 202, credential information for the managing account is provided to the trusted intermediate service manager. In one or more embodiments, the credential information (also referred to as "credentials") for the managing account may be associated with the web-based service. To clarify, the login information used to log into the trusted intermediate service manager may be different information from the credentials of the web-based service.

In Step 204, access conditions for accessing the managing account by one or more accessing accounts are set up. In one or more embodiments, the access condition specifies the type of access to be granted to (or revoked from) other users of the trusted intermediate service manager when using the managing account.

In one or more embodiments, the access conditions may be enforced by the trusted intermediate service manager using the user interface of the trusted intermediate service manager. For example, the user interface may not display any options associated with actions that are specified to be revoked in the access conditions.

In one example, for a web-based service that provides banking services (e.g., viewing account balance for a checking account, transferring funds between checking accounts, viewing bank statements, etc.), an access condition may specify that users accessing the managing account of this web-based service may be granted access to view the account balance, but permission to transfer funds between checking accounts may not be permitted. In this example, the user interface of the trusted intermediate service manager does not display nor provide any option to transfer funds, thus revoking the access to such actions in accordance with the access condition.

In one or more embodiments, the access conditions may be enforced by the trusted intermediate service manager by not forwarding any requests, performed using the user interface of the trusted intermediate service manager, that are not permitted by the accessing client in accordance with access conditions.

In a second example, consider a scenario in which a web-based service provides a social media platform that includes actions such as posting pictures, sending messages to other users, and configuring personal settings. An access condition may specify providing any action on a managing account of the social media platform with the exception of configuring the credentials (i.e., the password) of the managing account. In this example, the access condition is enforced by not forwarding a request, made through the user interface of the trusted intermediate service manager, to change the password of the managing account. Said another way, the request to change the password may be available as an option through the user interface, but will not be forwarded to the social media platform. Instead, the user interface of the trusted intermediate service manager may send a notification that such request cannot be serviced.

In one or more embodiments, the method may end following Step 204.

Figure 22:
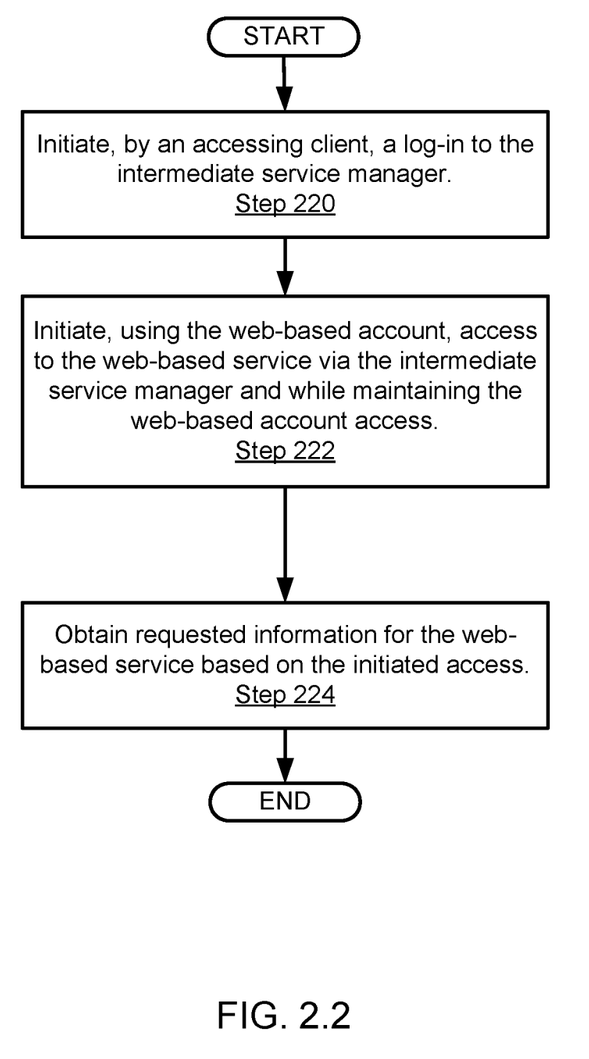

FIG. 2.2 shows a method for accessing a managing account using a trusted intermediate service manager in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.2, the method shown in FIG. 2.2 may be executed by, for example, one of the above-discussed accessing clients (e.g., 112, FIG. 1). Other components of the system (100) illustrated in FIG. 1 may also execute all or part of the method shown in FIG. 2.2 without departing from the scope of the invention.

In Step 220, a login to the trusted intermediate service manager is initiated. Similar to Step 200 of FIG. 2.1, the client (i.e., the accessing client) may log into the trusted intermediate service manager using the login information associated with the trusted intermediate service manager for the account of the accessing client. The login information may include, for example, a username and a password. Following the login, the trusted intermediate service manager identifies the accessing client as specified in the access conditions discussed in FIG. 2.1.

In Step 222, access to the web-based service is initiated. In one or more embodiments, the access is initiated by sending a request to the trusted intermediate service manager, via its user interface, to log into the managing account of the web-based service. The trusted intermediate service manager may, in response, use the stored credentials to log into the managing account of the web-based service. In this manner, the credentials are not shared with the accessing client.

In one or more embodiments, the access is further initiated by updating the user interface to display: (i) any information associated with the managing account as permitted in the access conditions, (ii) options for performing actions on the managing account as permitted in the access conditions, and (iii) other information of the web-based service without departing from the invention. The cosmetic details of the user interface (e.g., layout, colors, font size, etc.) may be different or substantially similar to a user interface of the web-based service.

In Step 224, requested information for the web-based service is obtained. As discussed above, any information displayed on the user interface may be provided to the accessing client (e.g., via the user interface). In this manner, the accessing client may use the obtained information to determine (or perform) further actions on behalf of the managing account and in accordance with the access conditions.

Start of Example

Figure 31:
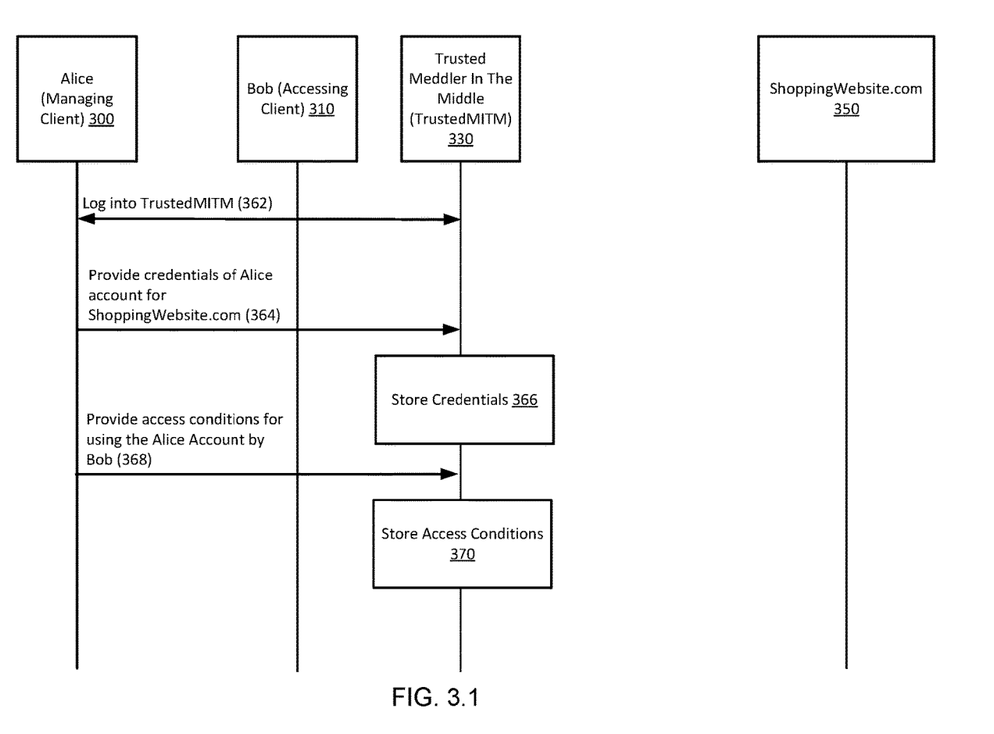
Figure 32:
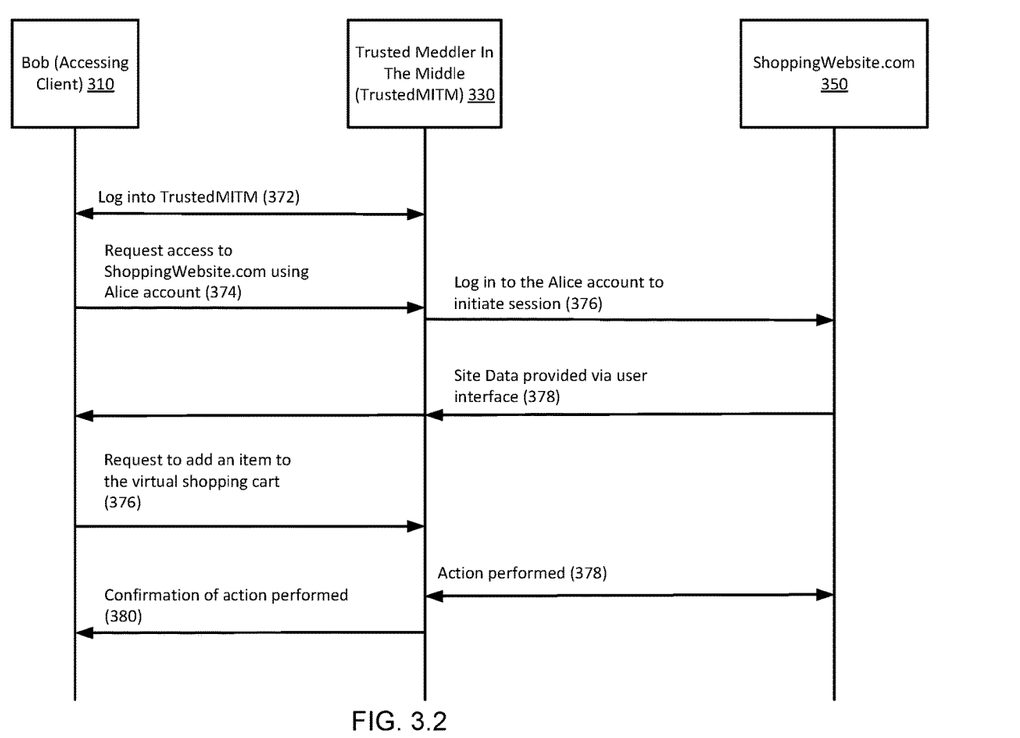
Figure 33:
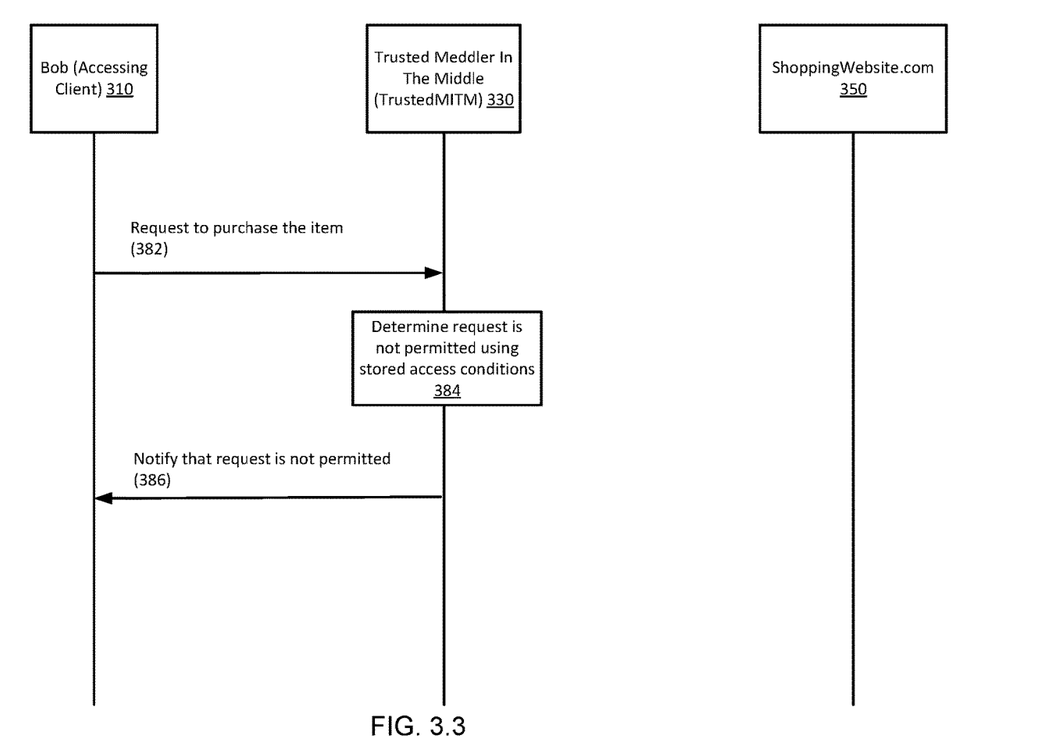

The following section describes an example of one or more embodiments. The example, illustrated in FIGS. 3.1-3.3, is not intended to limit the scope of the embodiments disclosed herein, and is independent from any other examples discussed in this application.

Turning now to FIG. 3.1, FIG. 3.1 shows a scenario in which a user named Alice, operating a managing client (300), desires to allow a second user named Bob, operating an accessing client (310), to access, in a limited capacity, a managing account to a shopping website with the URL ShoppingWebsite.com (350). To provide this access in the limited capacity, the managing client (300) utilizes a trusted meddler in the middle (TrustedMITM) (330). The TrustedMITM (330) includes the functionality of the trusted intermediate service manager (130, FIG. 1) discussed throughout this disclosure. Specifically, the managing client (300) desires to provide the accessing client (310) the access to add items in ShoppingWebsite.com (350) to a virtual shopping cart of the managing account. However, the managing client (300) would not like to provide the ability for the accessing client (310) to purchase anything from the cart or access any banking information stored in the managing account.

The managing client (300) creates a first Trusted MITM account with the TrustedMITM (330) for the managing client (300). The accessing client (310) creates a second TrustedMITM account (330).

At one point in time, the managing client (300) logs into the Trusted MITM (362). The TrustedMITM (330) determines the identity of the managing client (300) based on the login. After the login, the managing client (300) provides the credentials to the managing account (also referred to as the "Alice account") of the shopping website (350) (364). The TrustedMITM (330) stores the credentials (366). Further, the managing client (300) provides the access conditions for the accessing client to use the Alice account (368). The access conditions specify that the accessing client (310) may add, remove, or otherwise change items in the virtual shopping cart of the shopping website and access the personal information of the Alice account. The access conditions further specify that the accessing client (310) may not purchase anything using the Alice account, nor have access to the banking information stored in the shopping website (350) for the Alice account. The TrustedMITM (330) stores these access conditions (370).

Turning to FIG. 3.2, Bob, the accessing client (310), logs into the TrustedMITM (330) using the second TrustedMITM account discussed above (FIG. 3.1, 372). After the login to TrustedMITM (330), the accessing client (310) sends a request to initiate a session with ShoppingWebsite.com using the Alice account (374). Using the credentials for the Alice account, and without providing said credentials to the accessing client (310), the TrustedMITM (330) logs into the Alice account on ShoppingWebsite.com (350) to initiate a session (376). Using the initiated session, the trusted intermediate service manager (130) generates site data that is obtained by the TrustedMITM (330) from the session and is within the access conditions, and provides such site data to the accessing client (310) via its user interface (378). The site data may include a visual layout of the website, account information associated with the Alice account that is within the access conditions, and/or any other data associated with the session that is within the access conditions.

At a later point in time, the accessing client (310) uses the user interface of the TrustedMITM (350) to send a first request for adding an item to the virtual shopping cart. Using the access conditions, the TrustedMITM (330) determines whether this action is action is permitted in accordance with the access condition. After determining that the action is permitted, the action is forwarded to the ShoppingWebsite.com in accordance with this first request. The action is performed by ShoppingWebsite.com (350) (378). The TrustedMITM (330) forwards confirmation of the action being serviced to the accessing client (310) (380).

Turning to FIG. 3.3, the accessing client (310) sends a second request, via the user interface, that specifies purchasing the item that is in the virtual shopping cart (382). The TrustedMITM (330) determines that the second request cannot be performed in accordance with the access conditions (384). Based on the determination, the TrustedMITM sends a notification to the accessing client, via the user interface, that the request is not permitted (386).

After the actions illustrated in FIGS. 3.1-3.3 are performed, the accessing client (310) may continue to utilize the user interface of the TrustedMITM (330) to access the Alice account. This may include performing actions and/or viewing information in accordance with the access conditions.

End of Example

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400)

to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments disclosed herein may be used to address the issues caused by sharing credential information for one account between multiple users. As entities (e.g., corporate entities, families, etc.) share an account owned primarily by one person, those that have the credential information have the possibility of performing actions or viewing information that may go against the desires of the primary owner. Embodiments disclosed herein may eliminate the requirement of sharing the credentials with people with antagonizing intent. Specifically, the implementation of the trusted intermediate service manager allows the accessing clients to perform actions on behalf of the managing account that are within a pre-defined set of rules. Such pre-defined set of rules (discussed throughout as the "access conditions") may or may not be offered by the web-based service itself.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A system, comprising:
   a managing client;
   an accessing client;
   a web-based service;
   a trusted intermediate service manager, comprising circuitry, programmed to:
   obtain, from the managing client, an access condition for the accessing client for a managing account of the web-based service by a second account of the accessing client;
   make a determination, based on login information, that the managing client is the managing client;
   obtain, after the determination and from the managing client, credentials for the managing account associated with the web-based service;
   obtain, after obtaining the access condition and from the accessing client, second login information for the second account;
   obtain, from the accessing client and after obtaining the second login information, a request for accessing the web-based service using the managing account; and
   service the request based on the access condition,
   wherein servicing the request comprises:
      accessing the web-based service using the managing account,
         wherein the web-based service provides transactional services, and
         wherein the request specifies purchasing from the web-based service;
      making a second determination that the request is within the access condition;
      based on the second determination, forwarding the request to the web-based service;
      obtaining a response from the web-based service associated with the purchasing; and
      providing the response to the accessing client.

2. The system of claim 1, wherein the access condition specifies limiting access to perform an action on the web-based service by the accessing client using the managing account.

3. The system of claim 2, wherein limiting the access comprises preventing the managing account from making a purchase by the accessing client.

4. The system of claim 1, wherein the credentials are not provided to the accessing client.

5. A method for managing access to a web-based service, the method comprising:
   obtaining, by a trusted intermediate service manager and from a managing client, login information for a first account to the trusted intermediate service manager;
   making a determination, based on the login information, that the managing client is the managing client;
   obtaining, after the determination and from the managing client, credentials for a managing account associated with the web-based service and an access condition of accessing the web-based service by a second account to the trusted intermediate service manager;
   obtaining, from an accessing client, second login information for the second account to the trusted intermediate service manager;
   obtaining a request, by the accessing client, for accessing the web-based service using the managing account; and
   based on the request and the access condition, communicating with the web-based service to obtain information associated with the request from the web-based service,
   wherein communicating with the web-based service comprises:
      accessing the web-based service using the managing account,
         wherein the web-based service provides transactional services, and
         wherein the request specifies purchasing from the web-based service;
      making a determination that the request is within the access condition;
      based on the determination, forwarding the request to the web-based service;
      obtaining a response from the web-based service associated with the purchasing, and
      providing the response to the accessing client.

6. The method of claim 5, wherein the response is provided via a user interface of the trusted intermediate service manager.

7. The method of claim 6, wherein the user interface is a graphical user interface (GUI).

8. The method of claim 5, wherein the access condition specifies limiting access to perform an action on the web-based service by the accessing client using the managing account.

9. The method of claim 5, wherein limiting the access comprises at least one of: preventing a first ability to change the credentials for the managing account, preventing a second ability to purchase a product using the managing account, specifying banking information that can be accessed, preventing a third ability to transfer funds between accounts, and preventing a fourth ability to access the managing account after a pre-defined period of time.

10. The method of claim 5, wherein the credentials are not provided to the accessing client.

11. A non-transitory computer readable medium comprising computer readable program code, which, when executed by a computer processor, enables the computer processor to perform a method for managing access to a web-based service, the method comprising:
   obtaining, by an intermediate service manager and from a managing client, credentials for a managing account associated with the web-based service and an access condition of accessing the web-based service by a second account to the intermediate service manager;
   obtaining a request, by an accessing client associated with the second account, for accessing the web-based service using the managing account; and
   based on the request and the access condition, communicating with the web-based service to create a session with the web-based service,
   wherein communicating with the web-based service comprises:
      accessing the web-based service using the managing account,
         wherein the web-based service provides transactional services, and
         wherein the request specifies purchasing from the web-based service;
      making a determination that the request is within the access condition;
      based on the determination, forwarding the request to the web-based service;
      obtaining a response from the web-based service associated with the purchasing, and
      providing the response to the accessing client; and
   providing access to site data associated with the session via a user interface and based on the access condition.

12. The non-transitory computer readable medium of claim 11, wherein the site data comprises information, and wherein the information is within the access condition.

13. The non-transitory computer readable medium of claim 11, wherein the user interface is a graphical user interface (GUI).

14. The non-transitory computer readable medium of claim 11, wherein the access condition specifies limiting access to perform an action on the web-based service by the accessing client using the managing account.

15. The non-transitory computer readable medium of claim 14, wherein limiting the access comprises at least one of: preventing a first ability to change the credentials for the managing account, preventing a second ability to purchase a product using the managing account, specifying banking information that can be accessed, preventing a third ability to transfer funds between accounts, and preventing a fourth ability to access the managing account after a pre-defined period of time.

16. The non-transitory computer readable medium of claim 11, wherein the credentials are not provided to the accessing client.

* * * * *